United States Patent [19]

Kim et al.

[11] Patent Number: 4,588,232
[45] Date of Patent: May 13, 1986

[54] APPARATUS FOR VARYING ECCENTRICALLY OF THE AXLE OF A BICYCLE WHEEL

[76] Inventors: Joo H. Kim, 2551 Loop 35 #701, Alvin, Tex. 77511; Rack K. Choi, 208 Soong-Wuy, 2-dong, Nam-ku, Inchoen City, Rep. of Korea

[21] Appl. No.: 648,906

[22] Filed: Sep. 7, 1984

[51] Int. Cl.⁴ .......................... B60B 27/00; B60B 35/00
[52] U.S. Cl. ................................... 301/1; 301/105 B; 280/229
[58] Field of Search ................ 301/1, 108 R, 108 B, 301/105 B; 280/229; 180/905, 906

[56] References Cited

U.S. PATENT DOCUMENTS

| | | | |
|---|---|---|---|
| 423,051 | 3/1890 | Haven | 301/1 |
| 605,182 | 6/1898 | Johnston | 280/229 |
| 654,182 | 7/1900 | Rupsch | 301/1 |
| 1,679,819 | 8/1928 | Fageol | 280/229 |
| 3,292,946 | 12/1966 | Melson | 280/229 |
| 3,799,581 | 3/1974 | Munn | 280/229 |

*Primary Examiner*—David A. Scherbel
*Attorney, Agent, or Firm*—Townsend and Townsend

[57] ABSTRACT

Disclosed is an apparatus for varying eccentrically or centrically the shaft of the bicycle wheel in order that the bicycle can run up and down wavy manner like horseback riding beside regular level riding. The apparatus has an eccentric hub including a shaft housing formed integrally in eccentric position between two hub discs having a plurality of notches corresponding to different eccentricities of the shaft and a shaft penetrated through said shaft housing, two circular supporting plates having a slot for locking and two cover plates so that each hub discs of the eccentric hub is rotatively mounted relatively between each hub disc housings of the circular supporting plates and each cover plates and can be rotated to adjust the eccentricity of the shaft, and a locking means fixed on said circular supporting plate for setting the hub disc in the selected eccentricity of the shaft by matching it with any one of the notches through the slot.

6 Claims, 6 Drawing Figures

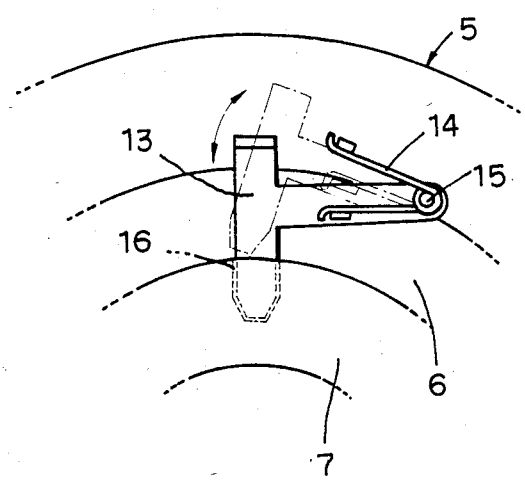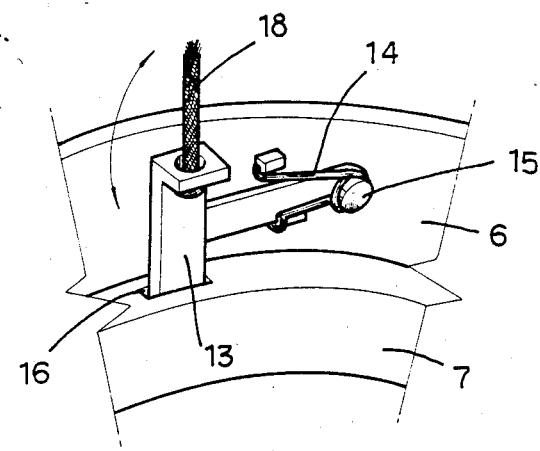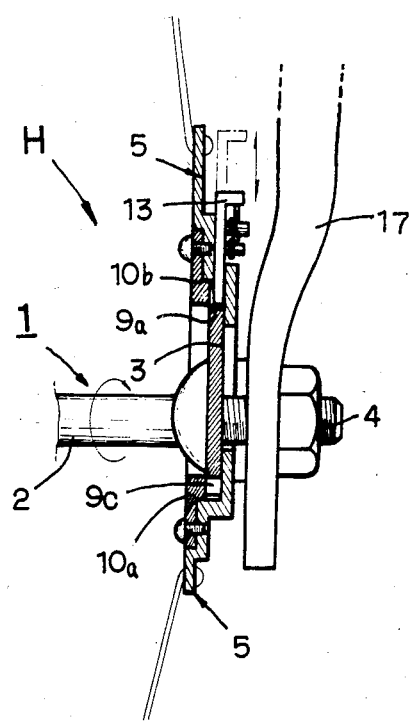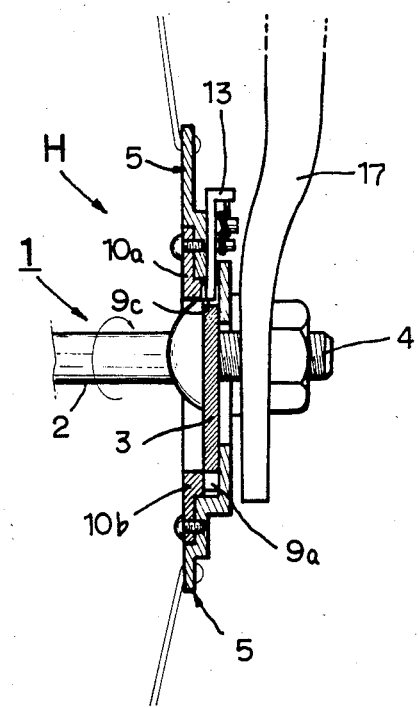

4,588,232

APPARATUS FOR VARYING ECCENTRICALLY OF THE AXLE OF A BICYCLE WHEEL

BACKGROUND OF THE INVENTION

1. Technical Field

This invention relates to an apparatus for varying eccentrically or centrically the shaft of the bicycle wheel, particularly an apparatus for shifting the bicycle shaft from its centric position to one of different eccentric positions and vise versa.

2. Background Art

Generally, all of the bicycles have unvariable shaft. Therefore, if the bicycle shaft is permanently fixed to the eccentric position by application of a simple principle, it is possible to ride the bicycle only in wavy manner up and down, but not possible for regular level riding, and for the dual purposes, two separate bicycles are necessary, one for wavy riding up and down, and other for regular level riding.

The object of this invention is to overcome such inconvenient and uneconomical feature, to provide an apparatus which is invented by renovation the shaft mechanism in such a way that the shaft in the centric position can be simply shifted to one of the different eccentric positions and also can be simply reset back to the centric position, thereby a single bicycle can serve the dual purposes.

SUMMARY OF THE INVENTION

In accordance with the invention, there is provided an eccentric hub having a shaft housing formed integrally in eccentric position between two hub discs and a shaft penetrated through the shaft housing. There is also provided two circular supporting plates so that the eccentric hub is rotatively mounted between two hub disc housings steped outwardly in eccentric position of each circular supporting plates and can be rotated to adjust the eccentricity of the shaft. There is also provided a plurality of notches on the circumference of circle of the hub disc to set the selected eccentricity of the shaft. There is also provided a locking means for setting the hub disc in the selected eccentricity of the shaft.

This object and other objects and characteristics of the invention will be understood completely by the detailed description of a prefered embodiment as explained drawings.

BRIEF DESCRIPTION OF THE DRAWINGS

FIG. 3 is a partial front view of FIG. 2, showing the operation of the locking means by hand;

FIG. 4 is a partial perspective view of FIG. 2, showing operation of the locking means by a wire connected to bicycle handle;

FIG. 5 is a partial sectional view cut along line Y—Y' of FIG. 2 showing when the shaft is in eccentric position;

FIG. 6 is the same as the FIG. 5, but showing the shaft is in centric position.

In the drawings, it should be noted that the same reference numerals are designated the same parts as a matter of convenient of explanation.

Referring to FIG. 1 and FIG. 2, they show a perspective view of the bicycle wheel having eccentrically variable hub H in accordance with the invention and a perspective view of the main part H of FIG. 1, disassembled only the one side cut along line X—X' of FIG. 1, respectively. Here it can be seen that the hub H comprises an eccentric hub 1 having a shaft housing 2 formed integrally in eccentric position between two hub discs 3 and a shaft 4 penetrated through the shaft housing 2, said eccentric hub 1 being supported rotatably in a fixed position on the shaft 4 and said hub disc 3 having four notches 9 on its circumference of circle, two circular supporting plates 5 having a cover housing 6, a hub disc housing 7 and a relatively large hole 8, respectively which are steped outwardly on the concentric circle of the eccentric position so that the eccentric hub 1 is reserved between the hub disc housings 7 and covered in the cover housings 6 by cover plates 10 and then can be rotated to adjust the eccentricity of the shaft 4, and a locking means 13 for setting the eccentric hub H on the selected eccentricity of the shaft 4.

Figure 1:
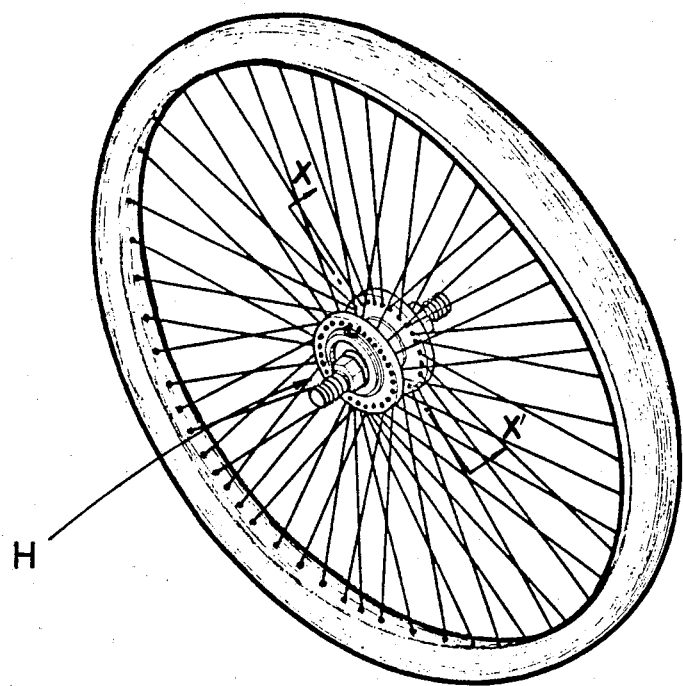
FIG. 1 is a perspective view of a bicycle wheel having an eccentrically variable hub by a prefered embodiment of the invention.
Figure 2:
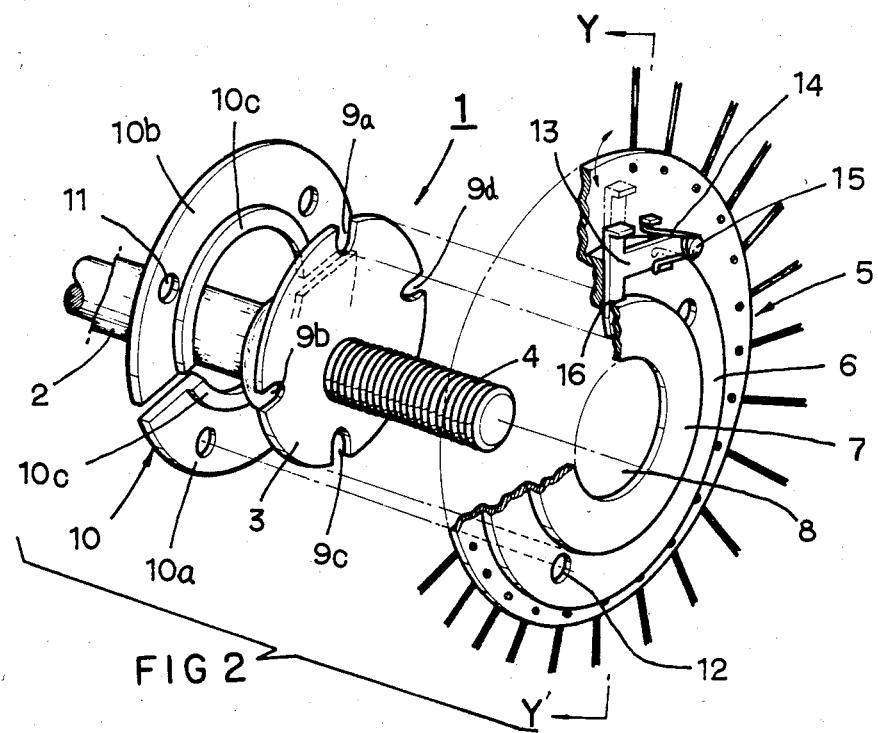
FIG. 2 is a perspective view of main part of FIG. 1, disassembled only the one side cut along line X—X' of FIG. 1.

More detailedly, the eccentric hub 1 consists of a shaft housing 2, two hub discs 3 and a shaft 4. The shaft housing 2 is fixed integrally in a desirable eccentric position between the two hub discs 3 and also the shaft 4 is penerated through the shaft housing 2 so that the eccentric hub 1 can be rotated in a fixed position on the shaft 4. The penerated shaft 3 has the exposed screw portions on its both sides to fix it by nut and washer on the bicycle body frame 17 as see in FIG. 5 and FIG. 6.

And also, the circular supporting plates 5 have a cover housing 6, a hub disc housing 7 and a relatively large hole 8, respectively and further a cover plate 10 which is covered in the cover housing 6, respectively.

All of the cover housing 6, hub disc housing 7 and a hole 8 are formed integrally on the cocentric circle of a disirable eccentric position of the plate 5 and the cover housing 6 the retain the cover plate 10 is more large size thean one of the hub disc housing 7 to retain the hub disc 3 and the hole 8 is more small size than one of the hub disc housing 7, while the cover housing 6 and the hub disc housing 7 are steped outwardly to form desirable spaces inside, and the hub disc housing 7 is protruded more than the cover housing 6 to form subsequent steps. The hole 8 is formed on centric circle of the hub disc housing 7 to exposure the screw portions of the shaft 4.

And also, the cover housing 6 has for example, four openings 12 for coupling on its circumference and the hub disc housing 7 has also a slot 16 for locking on its upper step.

Further, the cover plate 10 consists of two semi-circles 10a and 10b devided into two parts and has four openings 11 for coupling and a ring 10c protruded inside to form a close gap in the disc housing 7.

While, the hub disc 3 has also for example, four notches 9a, 9b, 9c and 9d for setting the hub disc 3 in a selected eccentric position. The notches correspond to the centric position of shaft 4 being 9a and other three different eccentric positions thereof being 9b, 9c and 9d. The number of the notches depends on the number of a desirable eccentric positions according to the eccentricity of shaft.

Furthermore, on the circular supporting plate 5 is secured a locking means 13 which is loaded by a wire spring 14 to move up and down on the fixed pin 15.

Therefore, it is possible to assemble the eccentrically variable hub H of bicycle wheel by inserting each hub discs 3 between each circular supporting plates 5 and each cover plates 10 to be retained and coupling them by bolts and nuts. At this time, since the hub H is secured by a plurality of spokes and the screw portions of the shaft 4 exposed through the holes 8 are also secured on their body frames 17 by nuts and washers, it is possible that the eccentric hub 1 is resolved between the circular supporting plates 5 to shift the shaft 4 to centric position or other three different eccentric positions and also set in its selected position to prevent it from revolving from an position to other positions.

The operation and effects of the hub having the eccentrically variable shaft as aforementioned in accordance with the invention will be understood apparently from the following descriptions explained with reference to FIG. 5 and FIG. 6.

In FIG. 5, it can be seen that since the circular supporting plate 5 has the hub disc housing 7 in eccentric position and the eccentric hub 1 has also a hub disc 3 in eccentric position, to keep the shaft 4 in eccentric position as in the drawing, the eccentric hub 1 must be rotated in order that the shaft 4 is in eccentric position, namely in the lower position below the centric position. Of course, at this time the locking means 13 is pulling up as shown in direction of arrow by hand or wire 18 and then after finished adjusting, again locked down to match it with the selected notch.

FIG. 6 is to show when the shaft 4 is in centric position. At this time, it can be also accomplished by the principle of the same operation that is, the eccentric hub 1 must be rotated to offset each other their eccentricity and the remaining are same as FIG. 5.

As aforementioned, in accordance with the invention, the shaft 4 of the hub H can be shifted easily and optionally into a desired position of the centric position or other three different eccentric positions by pulling up the locking means 13 by hand or wire and then rotating the eccentric hub 1 and finally leaving it to lock again, thereby it is very convenient that as a single bicycle, user can enjoy subsidary effective exercise of whole body such that the bicycle runs up and down wave manner like horseback riding.

It will be understood by skilled one in field of the art that the hub H in accordance with the invention may installed in either one of the front or back wheel or both of wheels and the locking means also may installed in either only one side of two circular supporting plates or all of both sides.

What is claimed is:

1. An apparatus for varying eccentrically and centrically the shaft of the bicycle wheel comprising, an eccentric hub including a shaft housing formed integrally in eccentric position between two hub discs and a shaft penetrated through the shaft housing, said eccentric hub being supported rotatively in a fixed position on said shaft and said hub disc having at least four notches corresponding to different eccentricities of said shaft on its circumference of circle, two circular supporting plates including two cover plates and having a cover housing, a hub disc housing and a relatively large hole, respectively which are stepped outwardly on the concentric circle of the eccentric position so that said each hub discs of said eccentric hub is reversed revolvably between said each hub disc housings and each cover plates to adjust the eccentricity of said shaft, and a locking means fixed on said circular supporting plate for setting said hub disc in the selected eccentricity of said shaft by matching it with any one of the notches.

2. An apparatus in accordance with claim 1, wherein said cover housing is to retain said cover plate and is larger than one of said disc housing, and said disc housing is to retain said hub disc and is also larger than one of said hole.

3. An apparatus in accordance with claim 1, wherein said disc housing is protruded more than said cover housing to form subsequent steps.

4. An apparatus in accordance with claim 1, wherein said cover housing has a plurality of openings for coupling on its circumference of circle and said disc housing has a slot for locking on its upper step.

5. An apparatus in accordance with claim 1, wherein said locking means is loaded resiliantly on a fixed pin of said circular supporting plate by a wire spring to move up and down in order to insert it through said slot into any one of said notches.

6. An apparatus in accordance with claim 1, said cover plate consists of two divided semi-circles, and has a plurality of openings for coupling and also a ring protruded inwardly on its inner circumference of circle which serves so that said hub disc is retained safely in said disc housing when assembling.

* * * * *